United States Patent
Katou

(10) Patent No.: US 6,482,127 B2
(45) Date of Patent: Nov. 19, 2002

(54) CONTROL SYSTEM OF AUTOMATIC TRANSMISSION

(75) Inventor: Yoshiaki Katou, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/935,341

(22) Filed: Aug. 22, 2001

(65) Prior Publication Data
US 2002/0046732 A1 Apr. 25, 2002

(30) Foreign Application Priority Data
Aug. 25, 2000 (JP) ........................... 2000-255610

(51) Int. Cl.$^7$ ............................................. B60R 41/20
(52) U.S. Cl. ........................... 477/192; 477/15; 477/20; 477/21; 477/200
(58) Field of Search ............................... 477/192, 4, 15, 477/20, 21, 115, 200, 204; 701/53, 54

(56) References Cited

U.S. PATENT DOCUMENTS 6,183,389 B1 * 2/2001 Tabata ........................ 477/174
6,371,889 B1 * 4/2002 Kuroda et al. .............. 477/181

FOREIGN PATENT DOCUMENTS

| JP | 11141367 | * | 5/1999 | ............ F02D/11/00 |
| JP | 2000199561 | * | 7/2000 | ............ F16H/61/00 |
| JP | 2002004909 | * | 1/2002 | ............ B60K/41/00 |

* cited by examiner

Primary Examiner—Richard M. Lorence
Assistant Examiner—Tisha D. Lewis
(74) Attorney, Agent, or Firm—Rossi & Associates

(57) ABSTRACT

In an automatic transmission which comprises: a starter motor for starting an engine and a hydraulic pressure source having a main pump driven by the engine and an assist pump driven by an electric motor, when an idling stop control unit outputs an idling stop signal to an engine control unit, an engine and an assist pump are stopped. When the idling stop control unit receives an OFF signal from a brake switch, the idling stop control unit outputs a cancellation command for canceling an idling stop operation to the engine control unit to drive a starter motor and the assist pump.

11 Claims, 4 Drawing Sheets

CONTROL SYSTEM OF AUTOMATIC TRANSMISSION

BACKGROUND OF THE INVENTION

1. Field of the Invention

This invention generally relates to a hydraulic control system of an automatic transmission. More particularly, this invention relates to a control system of an automatic transmission provided with two oil pumps serving as sources of hydraulic pressure.

2. Description of the Prior Art

In recent years, an idling stop vehicle has been developed which automatically stops an engine to reduce the fuel consumption, the exhaust emission, the noise, etc. when the vehicle stops running and predetermined stop conditions are satisfied. In such a vehicle, the stop of the engine stops a main pump driven by the engine. Therefore, oil supplied to a forward clutch of an automatic transmission gets out of an oil channel to lower the hydraulic pressure. Thus, the forward clutch, which should be engaged in the forward driving, is disengaged at the restart of the engine. If the forward clutch is not quickly engaged at the restart of the engine, an accelerator pedal is operated in a neutral state so that the forward clutch is engaged while the engine is blowing up. This generates an engagement shock.

To address this problem, there has been developed the technique disclosed in Japanese Patent Application Laid-Open Publication No. 2000-46166. According to this technique, two pumps are used; a main pump and an assist pump. Driving the main pump supplies fluids, and when the main pump stops while an engine is stopped, the assist pump driven by the electric motor is singly operated to compensate the shortage of oil flow. This aims to ensure that the supply of working fluids to an automatic transmission is kept while controlling the battery power consumption to the minimum level.

According to the above prior art, however, the assist pump driven by the electric motor is operated while the engine is stopped. This consumes a large amount of power in reality. Particularly in a traffic jam or the like, the battery and the motor for driving the assist pump are overburdened.

SUMMARY OF THE INVENTION

It is therefore an object of the present invention to provide a hydraulic control system of an automatic transmission which has a main pump driven by an engine and an assist pump driven by an electric motor, the hydraulic control system which is able to supply necessary hydraulic pressure without burdening the electric motor or a battery to realize smooth driving even if the main pump stops to cause the assist pump to supply hydraulic pressure when an idling stop controlling operation is carried out.

The above object can be accomplished by providing a method for controlling an automatic transmission which comprises a hydraulic pressure source including a main pump driven by an engine and an assist pump driven by an electric motor, and an idling stop switch, the method comprising: detecting a vehicle speed, a steering angle and a brake operation; stopping the engine and the assist pump, when predetermined conditions for idling stop operation are detected according to the vehicle speed, the steering angle and the brake operation; and then driving a starter motor for starting the engine to cancel the idling stop operation and the assist pump, if the brake is not in operation, or the idling stop switch is operated to terminate the idling stop operation.

According to the present invention, when the engine is stopped due to the idling stop operation, the electric motor also stops driving the assist pump. This prevents the electric motor from continuing its operation while the idling is stopped. This enables the idle stop controlling operation without burdening the battery or the electric motor.

Further, the idling stop operation can be cancelled by operating the idling stop switch if desired. And when the idling stop operation is cancelled both the starter motor and the electric motor are actuated to restart the engine while supplying sufficient hydraulic pressure to the automatic transmission from the assist pump, thereby realizing smooth driving.

The above object can also be accomplished by providing a control system of an automatic transmission which comprises: a starter motor for starting an engine; a hydraulic pressure source having a main pump driven by the engine and an assist pump driven by an electric motor; idling stop control unit for outputting engine idling operation signal and idling stop signal to an engine control unit under predetermined idling stop conditions according to a vehicle speed signal detected by a vehicle speed sensor, a steering angle detected by a steering angle sensor, and a signal from a brake switch detecting whether a brake is operated or not; the control system comprising: an idling stop switch for switching an operation of the idling stop control unit between an idling operation and an idling stop operation; wherein if the idling stop control unit outputs an idling stop signal to the engine control unit, the assist pump as well as the engine are stopped; if the idling stop control unit receives an OFF signal from the brake switch or receives an idling stop control termination signal from the idling stop switch, the idling stop control unit outputs a cancellation command for canceling the idling stop operation to the engine control unit to drive the starter motor and drive the assist pump.

According to the invention, when the idling stop control unit stops idling the engine, the electric motor also stops driving the assist pump. This prevents the electric motor from continuing its operation while the idling is stopped. This enables the idle stop controlling operation without burdening the battery or the electric motor.

Further, since the control system of the automatic transmission has the idling stop switch that switches the operation of the idling stop control unit between the idling operation and the idling stop operation, it is therefore possible to cancel the idling stop operation even if the idling stop conditions are satisfied for the idling stop control unit. For example, if a driver desires to operate an air conditioner or the like while the idling is stopped, the battery will be overburdened by the operation of the air conditioner while the engine is stopped. To address this problem, the idling stop operation is canceled to run the engine, and this enables the operation of the air conditioner or the like without burdening the battery.

Further, if a cancellation command for canceling the stop of idling is outputted, both the starter generator for starting the engine and the electric motor for driving the assist pump are actuated to restart the engine while supplying sufficient hydraulic pressure to the automatic transmission. This realizes smooth driving.

According to one preferred form of the present invention, if the idling stop control unit outputs a cancellation command to the engine control unit, the electric motor for driving the assist pump is actuated a predetermined period of time before actuation of starter motor; and the predetermined period of time is determined to be longer for lower oil temperature and shorter for higher oil temperature.

Since the oil should be supplied to an oil channel to a clutch for restarting the vehicle, the assist pump is actuated a predetermined period of time before the actuation of the starter generator. More specifically, it may be impossible to ensure sufficient hydraulic pressure due to the viscosity resistance of the oil just after the actuation of the assist pump, because the viscosity of oil is high when the oil temperature is low. Therefore, as the oil temperature lowers, the predetermined period of time is increased so as to ensure sufficient hydraulic pressure.

According to another preferred form of the present invention, when an oil temperature is not higher than a predetermined temperature, the idling stop operation is prohibited even if the conditions for idling stop are satisfied.

If the oil temperature is low, the viscosity of the oil is high. In this case, it is impossible to supply sufficient hydraulic pressure to a transmission unit and more particularly to the forward clutch, etc. that require engagement pressure when the vehicle is started. This causes a starting shock and the like. To address this problem, the idling is stopped only when an oil temperature ensuring a certain viscosity is reached. This enables the stable idling stop controlling operation.

According to yet another preferred form of the present invention, the idling stop switch is a snap switch.

This makes it possible to switch the control state only by pressing one switch when the driver requires the controlling operation to stop or start. Basically, the idling stop control operation is automatically started when the driver operates the ignition key. Thus, the idling stop controlling operation automatically carries out or stops the idling operation. Accordingly, there are required two switching functions, one of which is for stopping the idling and the other is for executing the idling to satisfy the driver's needs. By using the snap switch, however, it is possible to easily switch the control state by operating only one switch without requiring the driver to perform any complicated operations.

According to yet another preferred form of the present invention, a discharge circuit of the assist pump is provided with a relief valve that maintains a discharge pressure of the assist pump at a predetermined pressure or lower.

Even if a driving force is excessive at the restart of the engine, an advance clutch, etc. that is engaged at the start of the vehicle is prevented from being supplied with excessive hydraulic pressure and the vehicle is prevented from moving suddenly at the restart of the engine due to excessive engagement force generated by the excessive driving force. The predetermined pressure is not greater than an inherent discharge pressure of a main pump when the engine is idling.

According to yet another preferred form of the present invention, the idling stop control unit is provided with an electric motor control section that maintains a discharge pressure of the assist pump driven by the electric motor at a predetermined pressure or lower.

This prevents the discharge pressure of the assist pump from becoming excessive. Although a control program is added, a control program is added, but there is no need for adding new components such as a relief valve to thus reduce the cost.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will hereunder be described with reference to the accompanying drawings.

Figure 1:
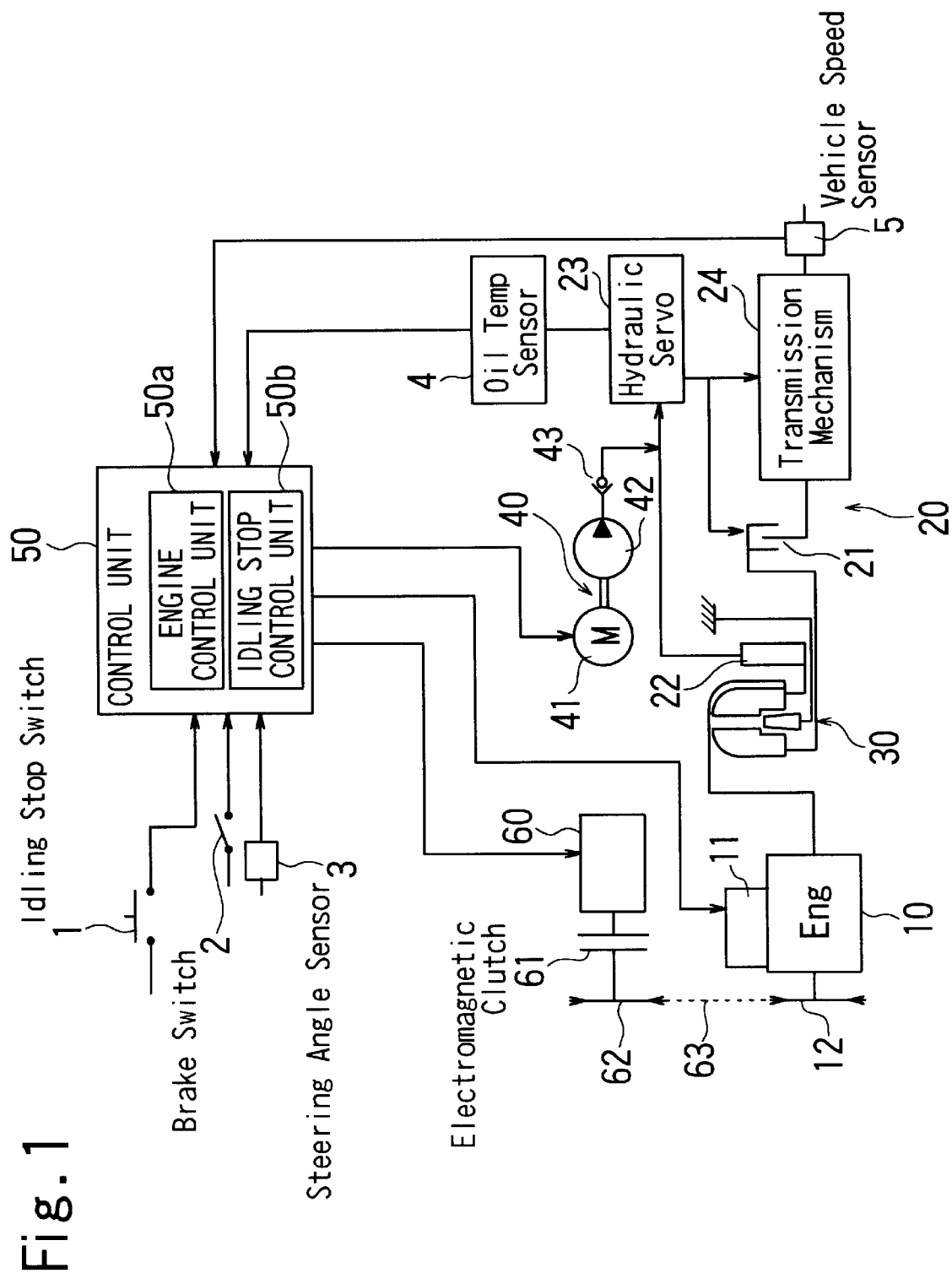
FIG. 1 is a block diagram showing principal units in a vehicle having a control system of an automatic transmission according to an embodiment of the present invention.

FIG. 1 is a block diagram showing a control system of an automatic transmission that is provided with an assist pump 40 according to an embodiment of the present invention.

An engine 10 is provided with a fuel supply device 11 that supplies fuel to the engine 10. The engine 10 is also provided with a chain sprocket 12 that is connected to a chain sprocket 62 through a chain 63. The chain sprocket 62 is connected to the starter generator 60 via an electromagnetic clutch 61.

If the starter generator 60 is connected to the engine 10 by engagement of the electromagnetic clutch 61, it functions as a starter motor for the engine 10, a generator in deceleration, or a generator that generates electric power according to the storage of a battery.

Torque outputted from the engine 10 is inputted to a transmission mechanism 24 through a torque converter 30 via an forward clutch 21 provided in the automatic transmission 20. The automatic transmission 20 is provided with a main pump 22 that rotates with the engine 10 and supplies hydraulic pressure to a hydraulic servo 23.

The control unit 50, which includes an engine control unit 50a and an idling stop control unit 50b, receives signals from an idling stop switch 1, a brake switch 2, a steering angle sensor 3, an oil temperature sensor 4, and a vehicle speed sensor 5 to control the operations of the starter generator 60, an electric motor 41 and the fuel supply device 11.

Figure 2:
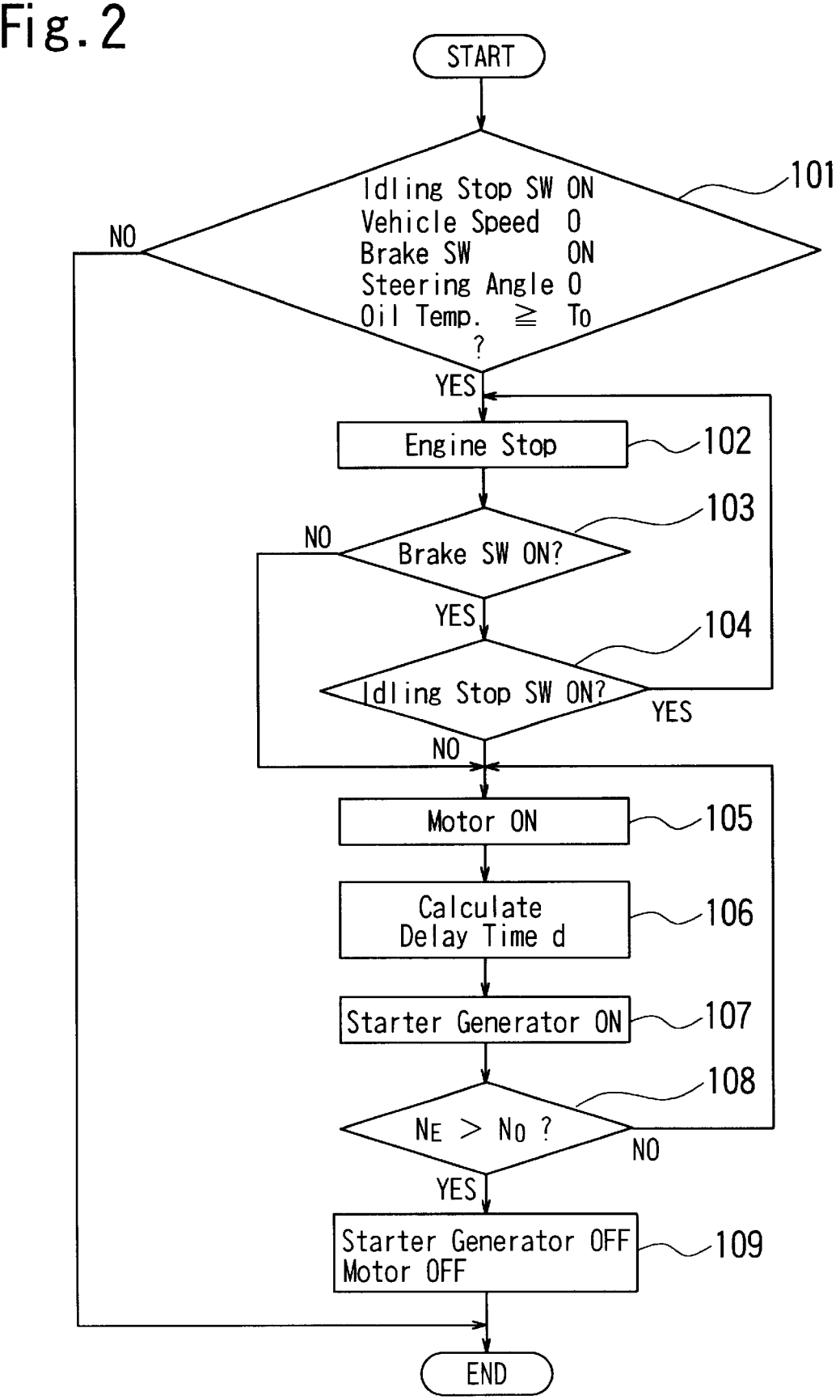
FIG. 2 is a flow chart showing the procedure for carrying an idling stop controlling operation according to the embodiment of the present invention.

FIG. 2 is a flow chart showing the procedure for carrying out an idling stop control operation according to an embodiment.

At step 101, it is determined whether the idling stop switch 1 is ON, the vehicle speed is zero, the brake switch is ON, the steering angle is zero, and the oil temperature is not less than a predetermined value. If all these conditions are satisfied, the program proceeds to step 102. If not, the idling stop control operation is not carried out.

At the step 102, the engine 10 is stopped.

At step 103, it is determined whether the brake switch 2 is ON or not. If the brake switch 2 is ON, the program proceeds to step 104. If not, the program proceeds to step 105.

At the step 104, it is determined whether the idling stop switch 1 is ON. If the idling stop switch 1 is OFF, the program proceeds to the step 105. The OFF state of the idling stop switch 1 forms a idling stop control termination signal for canceling the stop of idling. If the idling stop switch 1 is ON, the program proceeds to the step 102 to stop the engine 10.

At the step 105, the electric motor 41 is operated.

Figure 3:
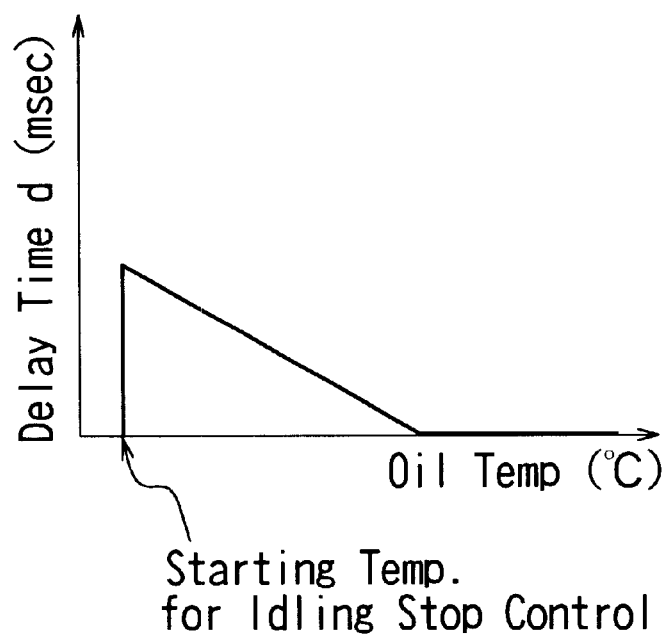
FIG. 3 is a diagram showing a relationship between the oil temperature and the delay time according to the embodiment of the present invention.
Figure 4:
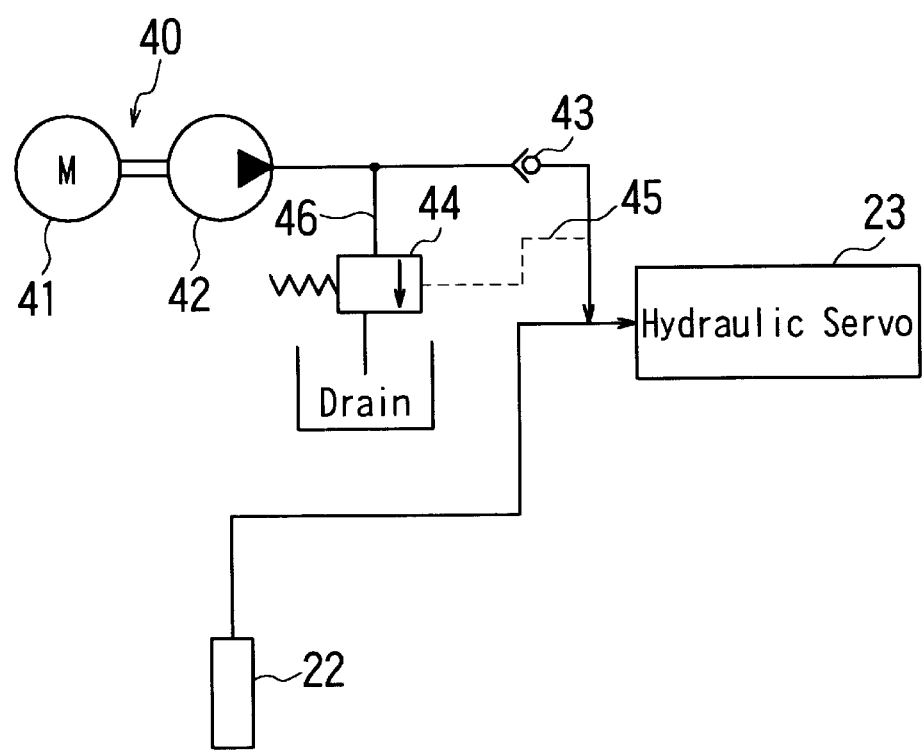
FIG. 4 is a diagram showing a discharge circuit of an assist pump according to another embodiment of the present invention.

At step 106, a delay time d is calculated based upon an oil temperature—delay time map as shown in FIG. 3.

At step 107, the starter generator 60 is operated if the delay time d calculated in the step 106 has elapsed.

At step 108, it is determined whether the engine speed NE exceeds a predetermined engine speed NO. If the engine speed NE exceeds NO, the program proceeds to step 109. If the engine speed NE is lower than NO, the program proceeds to the step 105 to continue running the electric motor 41 and the starter generator 60.

At the step 109, the operation of the starter generator 60 and the electric motor 41 is stopped.

In the flow chart, the steps 101,and 103 to 106 are performed by the idling stop control unit 50b, and steps 102, and 107 to 107 are performed by the engine control unit 50a.

More specifically, the engine 10 is stopped when the following conditions are satisfied: a driver wants to carry out the idling stop control operation, the vehicle is stopped, the brake pedal is depressed, the steering angle is zero, and the oil temperature is not less than a predetermined value (an idling stop control starting temperature). The idle stop switch 1 is used to transmit the driver's intention to carry out or cancel the idling stop operation. This switch is ON as an initial state when an ignition key is rotated to the ON position. The reason why the engine stop conditions include the steering angle of zero is to prohibit the idling stop operation when the vehicle temporarily stops running, e.g. when the vehicle is turning right at an intersection of roads. The reason why the engine stop conditions include the oil temperature of a predetermined value or more is to ensure the viscosity of oil that enables the assist pump 40 to surely supply hydraulic pressure.

When the brake is released, it is determined that the driver intends to start the engine. If the idle stop switch 1 is not ON, it is determined that the driver intends to start the engine even if the brake pedal is pushed.

While the engine 10 is stopped by the idling stop operation, an air conditioner or the like cannot be used to prevent a burden on the battery. If, however, the driver feels that the temperature in a vehicle compartment is too high, the idling stop control operation can be canceled according to the intention of the driver. This enables the controlling operation conforming to the intentions of the driver.

Accordingly, the electric motor 41 is actuated first to cause the assist pump 40 to supply hydraulic pressure to the hydraulic servo 23.

When, for example, the engine is stopped, oil supplied to the forward clutch 21 of the automatic transmission gets out of an oil channel to lower the hydraulic pressure. Thus, the forward clutch 21, which should be engaged in the forward driving, is disengaged at the restart of the engine 10. If the forward clutch is not quickly engaged at the restart of the engine, an accelerator pedal is operated by the foot in a neutral state to engage the forward clutch 21 while the engine 10 is blowing up. This generates an engagement shock.

To address this problem, the hydraulic pressure is supplied in advance.

Further, a delay time d is calculated based upon an oil temperature—delay time map shown in FIG. 3. This calculation is intended to determine a period of time from the actuation of the assist pump 40 to the actuation of the starter generator 60 so as to supply sufficient hydraulic pressure to the automatic transmission 20. More specifically, since the oil has a high viscosity at a low oil temperature, sufficient oil pressure may not be secured due to the viscosity resistance of oil just after the actuation of the assist pump 40. Thus, as the oil temperature lowers, the period of time between the actuation of the assist pump 40 and the actuation of the starter generator 60 becomes longer to ensure sufficient hydraulic pressure. If the oil temperature is not less than a predetermined value, the delay time d is set to zero.

Upon elapse of the delay time, the starter generator 60 is actuated. The starter generator 60 and the assist pump 40 are operated until the engine speed NE exceeds a predetermined value NO. When the engine speed NE exceeds the predetermined value NO, the starter generator 60 and the assist pump 40 are stopped.

The control system of the automatic transmission according to the present embodiment constructed in the above-mentioned manner stops the assist pump 40 driven by the electric motor 41 when the idling of the engine 10 is stopped by the idling stop controlling operation. This prevents the electric motor 41 from continuing its operation while the idling is stopped as in the prior art. This enables the idling stop control operation without burdening the battery or the electric motor 41.

Moreover, the control system of the automatic transmission according to the present embodiment is provided with the idling stop switch 1 that switches the controlling operation between the idling operation and the idling stop operation. This makes it possible to cancel the stop of idling even if the idling stop conditions are satisfied for the idling stop control.

Moreover, if a cancellation command for canceling the stop of idling is outputted, both the starter generator 60 for starting the engine and the electric motor 41 for driving the assist pump 40 are actuated to restart the engine 10 while supplying sufficient hydraulic pressure to the automatic transmission 20. This realizes smooth driving.

When a command for canceling the stop of idling is outputted while the idling is stopped, the assist pump 40 is actuated the delay time d before the actuation of the starter generator 60. The delay time d is varied according to the oil temperature. Since it may be impossible to ensure sufficient hydraulic pressure due to the viscosity resistance of the oil just after the actuation of the assist pump 40, because the viscosity of oil is high when the oil temperature is low. Therefore, as the oil temperature lowers, the delay time d is increased so as to ensure sufficient hydraulic pressure.

For the same reason, when the oil temperature is very low, it is impossible to supply sufficient hydraulic pressure to a transmission unit and more particularly to the forward clutch 21, etc. that require engagement pressure when the vehicle is started. This causes a starting shock and the like. To address this problem, the stop of idling is prohibited if the oil temperature is lower than a predetermined value. The idling is stopped only when an oil temperature ensuring a certain viscosity is reached. This enables the stable idling stop controlling operation.

Further, the use of a snap switch as the idling stop switch 1 makes it possible to switch the control state only by pressing one switch when the driver requires the controlling operation to stop or start. Basically, the idling stop control operation is automatically started when the driver operates the ignition key to start the engine. Thus, the idling stop controlling operation automatically carries out or stops the idling.

By using the snap switch, it is possible to easily switch the control state by only one operation without requiring the driver to perform any complicated operations.

It should be understood, however, that there is no intention to limit the invention to the embodiment described above. For example, the storage condition of the battery may be added to the idling stop conditions. Since the engine must be restarted just after the stop of idling if the storage of the battery is not greater than a predetermined value, the idling may be continued even if the idling stop switch 1 is ON.

Further, a relief valve 44, an operational signal pressure oil channel 45 and a relief circuit 46 may be provided in the discharge circuit of the electric pump 40. When the hydraulic pressure generated by the assist pump is excessively high, hydraulic pressure from the operational signal pressure oil channel 45 switches a relief valve 44 to a drain side to cause the oil to be drained through the relief circuit 46. Thus, the discharge pressure of the electric pump 40 is restricted to a predetermined pressure or lower. Therefore, even if a driving force is excessive at the restart of the engine, the forward clutch 21 slips to execute a limiter function to thus prevent the vehicle from moving suddenly at the restart of the engine because the hydraulic pressure of the hydraulic servo 23 is low.

Further, when the electric pump 40 is actuated, a rotation control or chopper control for the electric motor 41, or the like is carried out to make the discharge from the electric pump 40 equal to or smaller than the discharge rate peculiar in idling. This prevents the vehicle from moving suddenly at the restart of the engine.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A control system of an automatic transmission which comprises: a starter motor for starting an engine; a hydraulic pressure source having a main pump driven by the engine and an assist pump driven by an electric motor; idling stop control unit for outputting engine idling start and stop signals to an engine control unit under predetermined idling stop conditions according to a vehicle speed signal detected by a vehicle speed sensor, a steering angle detected by a steering angle sensor, and a signal from a brake switch detecting whether a brake is operated or not; said control system comprising:

an idling stop switch for switching an operation of said idling stop control unit between an idling operation and an idling stop operation;

wherein if said idling stop control unit outputs an idling stop signal to the engine control unit, said assist pump as well as the engine are stopped;

if said idling stop control unit receives an OFF signal from the brake switch or receives an idling stop control termination signal from said idling stop switch, said idling stop control unit outputs a cancellation command for canceling the idling stop operation to the engine control unit to drive said starter motor and drive said assist pump.

2. A control system of an automatic transmission according to claim 1, wherein:

if said idling stop control unit outputs a cancellation command to the engine control unit, the electric motor for driving said assist pump is actuated a predetermined period of time before actuation of starter motor; and the predetermined period of time is determined to be longer for lower oil temperature and shorter for higher oil temperature.

3. A control system of an automatic transmission according to claim 1, wherein:

when an oil temperature is not greater than a predetermined temperature, the idling stop operation is prohibited even if the idling stop conditions are satisfied.

4. A control system of an automatic transmission according to any one of claim 1 to claim 3, wherein:

said idling stop switch is a snap switch.

5. A control system of an automatic transmission according to claim 1, wherein:

a discharge circuit of said assist pump is provided with a relief valve that maintains a discharge pressure of said assist pump at a predetermined pressure or lower.

6. A control system of an automatic transmission according to claim 1, wherein:

said idling stop control unit is provided with an electric motor control section that maintains a discharge pressure of said assist pump driven by said electric motor at a predetermined pressure or lower.

7. Method for controlling an automatic transmission which comprises a hydraulic pressure source including a main pump driven by an engine and an assist pump driven by an electric motor, and an idling stop switch, the method comprising:

detecting a vehicle speed, a steering angle and a brake operation;

stopping the engine and said assist pump, when predetermined conditions for idling stop operation are detected according to the vehicle speed, the steering angle and the brake operation; and then driving a starter motor for starting the engine and driving said assist pump to cancel the idling stop operation if said brake is not in operation, or said idling stop switch is operated to terminate the idling stop operation.

8. Method for controlling an automatic transmission according to claim 7, wherein:

the electric motor for driving said assist pump is actuated a predetermined period of time before actuation of starter motor when said idling stop operation is cancelled; and the predetermined period of time is determined to be longer for lower oil temperature and shorter for higher oil temperature.

9. Method for controlling an automatic transmission according to claim 7, wherein:

when an oil temperature is not greater than a predetermined temperature, the idling stop operation is prohibited even if the conditions for idling stop operation are satisfied.

10. Method for controlling an automatic transmission according to claim 7, wherein:

a discharge pressure of said assist pump is maintained at a predetermined pressure or lower by providing a discharge circuit of said assist pump with a relief valve.

11. Method for controlling an automatic transmission according to claim 7, wherein:

a discharge pressure of said assist pump is maintained at a predetermined pressure or lower by controlling said electric motor.

* * * * *